INVENTOR.
Howard G. Powell
BY Harness & Harris
ATTORNEYS.

Jan. 23, 1968  H. G. POWELL  3,364,768
MULTIPLE SPEED POWER TRANSMISSION MECHANISM
Filed May 3, 1965  4 Sheets-Sheet 3

INVENTOR.
Howard G. Powell
BY
Harness & Harris
ATTORNEYS.

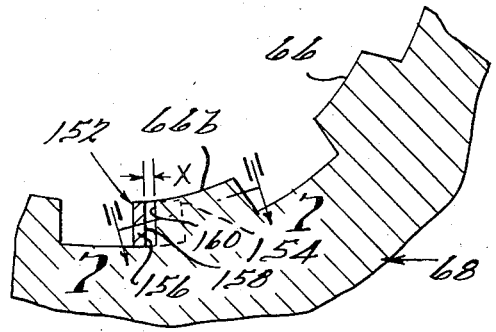
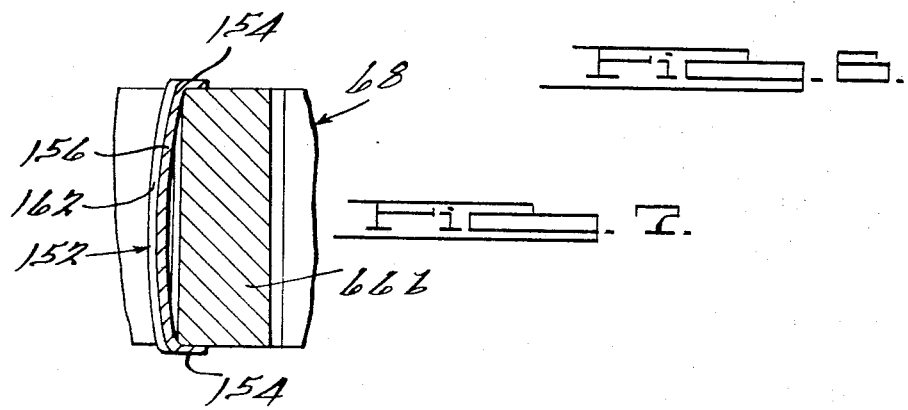
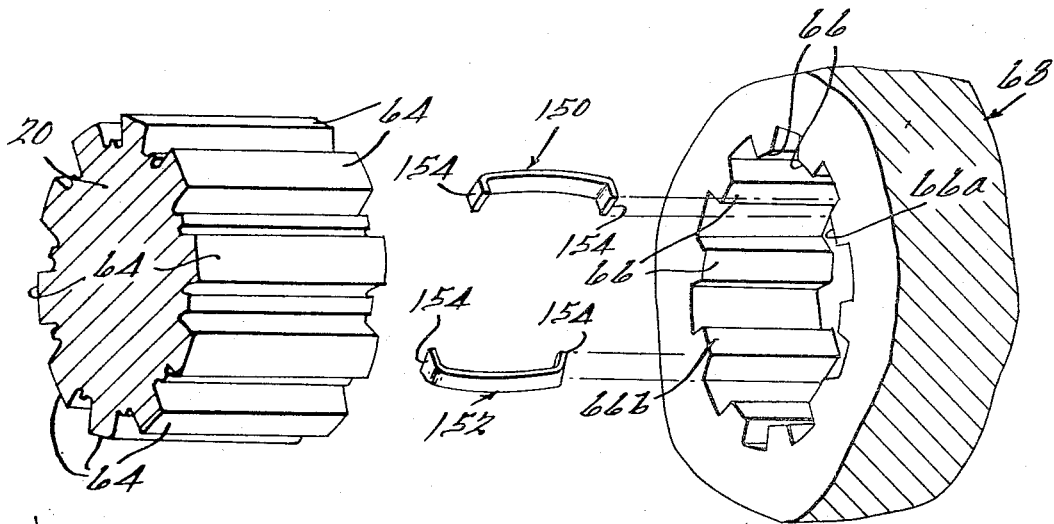

United States Patent Office 3,364,768
Patented Jan. 23, 1968

3,364,768
MULTIPLE SPEED POWER TRANSMISSION MECHANISM
Howard G. Powell, Clay, N.Y., assignor to Chrysler Corporation, Highland Park, Mich., a corporation of Delaware
Filed May 3, 1965, Ser. No. 452,800
12 Claims. (Cl. 74—339)

ABSTRACT OF THE DISCLOSURE

An anti-rattle spring for use with an internally splined gear slidably mounted on an externally splined shaft. The spring is compressed between the coast side of one of the gear splines and the confronting coast side of the adjacent shaft spline so as to continuously press the drive sides of the gear splines against the drive sides of the shaft splines.

---

This invention relates generally to a multiple speed power transmission mechanism and more particularly to the provision of anti-rattle means, in such a mechanism, for the elimination of oscillatory noises developed by at least some of the gears therein during certain periods of transmission operation.

In a conventional counter-shaft type multiple speed transmission having, for example, synchronized gears mounted on the transmission output shaft and a cluster gear assembly mounted on or formed integrally with the counter-shaft, a first sliding gear is employed for selectively engaging certain of the individual gears of the cluster assembly to the transmission output shaft in order to effect the desired forward speed. In such arrangements, a second sliding gear is usually employed for completing the low forward speed and reverse speed drive train from the transmission power input shaft to the power output shaft. Generally, especially in transmissions having three forward speed gears, this is accomplished by selectively causing the second sliding gear to engage either the transmission low forward speed gear or the reverse idler gear.

Generally, shifter forks are employed for engaging and axially shifting such sliding gears. In many cases such sliding gears are formed with an internally splined hub which slidably fits over external splines of, for example, the transmission output shaft.

In order to assure ease in shifting such splined sliding gears, suitable tolerances must exist between the external and internal splines.

During certain periods of transmission operation such splined sliding gears are not transmitting any power and, as a consequence of the above-mentioned tolerances, have a tendency to oscillate or rattle.

Accordingly, an object of this invention is to provide means for damping or eliminating the rattle of such gears which are rotating on a shaft but not transmitting power to or from the shaft.

Another object of this invention is to provide resilient means carried by either the gear or the gear-carrying shaft for engaging both the gear and shaft in order to damp gear oscillations and rattles.

A further object of this invention is to provide, as an anti-rattle device, simple resilient means which can be quickly and easily applied to, for example, the gear and which will not hinder the assembly of such gear to the cooperating shaft.

Other more specific objects and advantages of this invention will become apparent when reference is made to the following description and accompanying drawings wherein:

FIGURE 2 is obtained generally in a plane indicated by line 2—2 of FIGURE 1 with the axis of the reverse idler gear being parallel to the axis of the cluster gear but displaced a distance above the plane of the drawing of FIGURE 1;

FIGURE 6 is an enlarged fragmentary view of that portion of the gear of FIGURE 4 indicated generally by circle A prior to its assembly to the cooperating splined shaft;

FIGURE 7 is a cross-sectional view taken generally on the plane of line 7—7 of FIGURE 6 and looking in the direction of the arrows;

FIGURE 9 is a transverse cross-sectional view taken generally on the plane of line 9—9 of FIGURE 8 and looking in the direction of the arrows.

Figure 1:
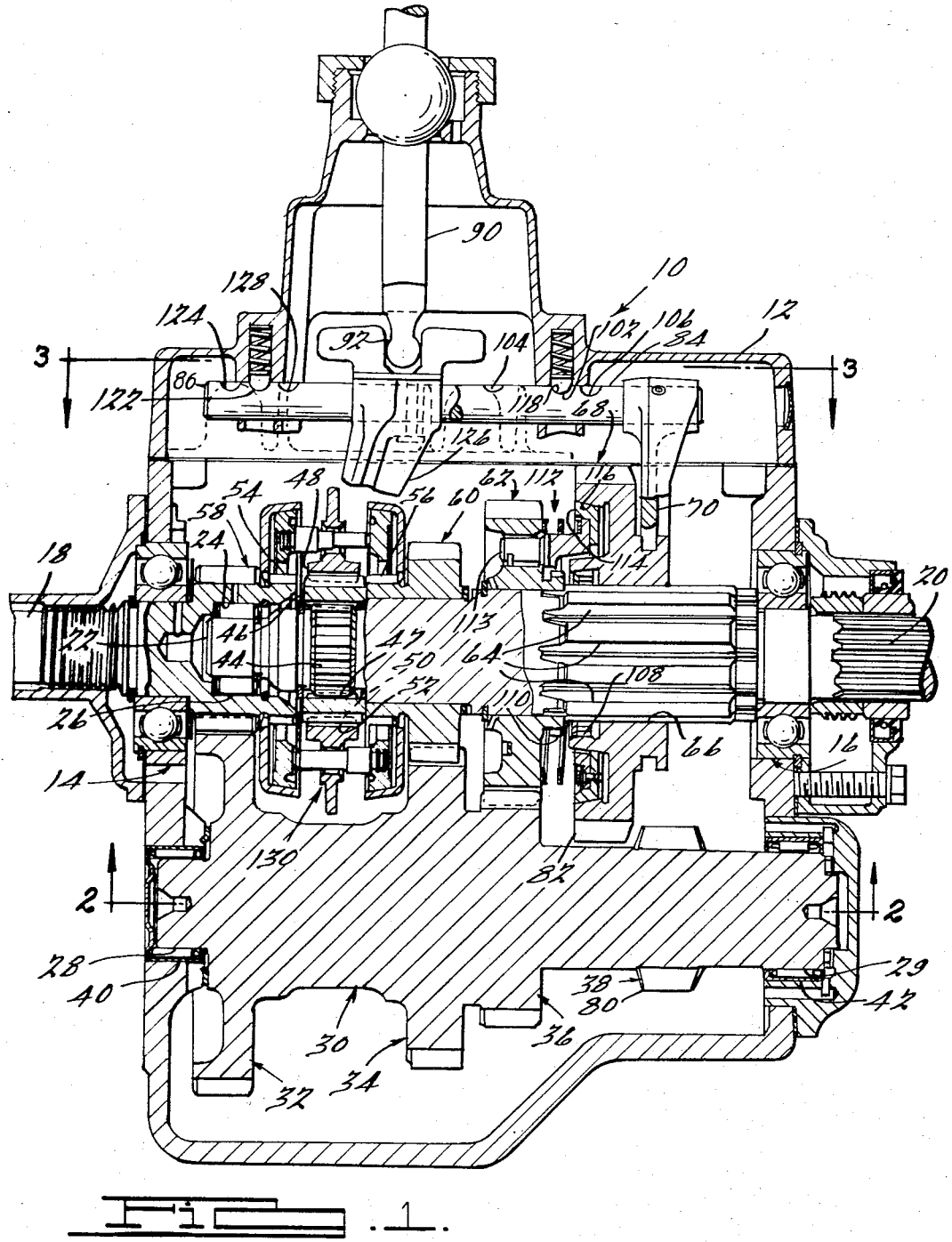
FIGURE 1 is a cross-sectional assembly view of a four-speed transmission mechanism constructed in accordance with the teachings of this invention.

Referring now in greater detail to the drawings, the transmission 10 of FIGURE 1 is illustrated as being comprised of a case 12 having coaxially situated bearing assemblies 14 and 16 which respectively serve to journal one end of a transmission input shaft 18 and a main shaft 20. The inner most end 22 of shaft 20 is piloted within a suitable bore 24 of input shaft 18 as by bearings 26.

A cluster gear assembly 30, having coaxial ends 28 and 29 suitably journaled in the case 12, comprises gears 32, 34, 36 andd 38. Bearings as at 40 and 42 may, of course, be provided for journaling the cluster gear assembly.

A splined portion 44 formed on mainshaft 20 receives hub 46 as by means of closely conforming splines 47 formed internally of said hub. The hub 46 is, of course, suitably restrained against axial movement with respect to the shaft 20 once the hub is properly assembled thereto. Clutch sleeve 48 is provided with internally formed splines 50 which slidingly engage external splines 52 formed on the periphery of hub 46. Splines 50 are adapted so as to be capable of being selectively engaged with either the clutch teeth 54 or 56 of gears 58 and 60, respectively.

Gear 58, a top or fourth speed gear, is in constant mesh with gear 32 of the cluster gear assembly 30; gear 60, a third speed gear, is in constant mesh with gear 34, while a second speed gear 62 is in constant mesh with gear 36. Gears 60 and 62 are, of course, freely rotatable on mainshaft 20.

A second splined portion 64, formed on shaft 20, slidingly engages splines 66 formed internally of a first speed gear 68. Splines 64 and 66 permit the axial shifting of gear 68 relative to the output shaft 20 as by a suitably engaging shifter fork 70.

Figure 2:
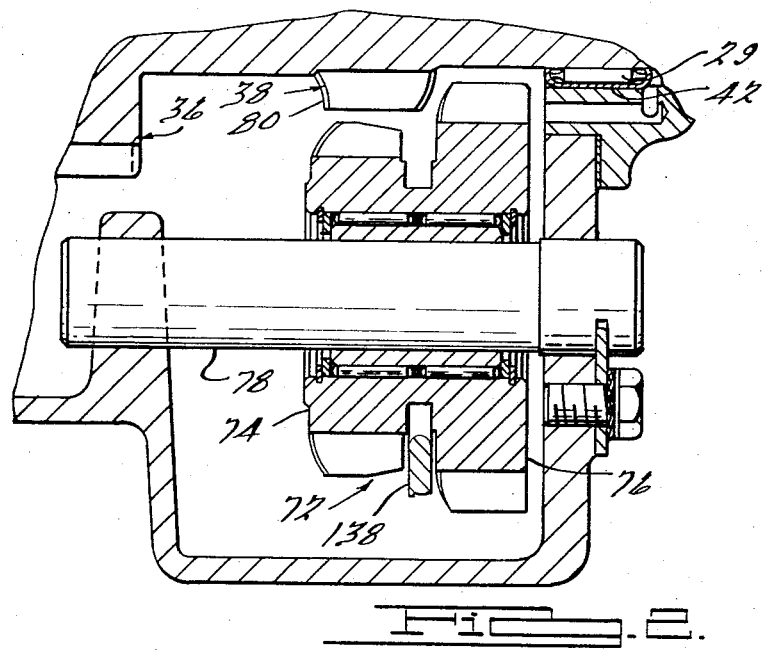
FIGURE 2 is a cross-sectional view of a portion of the cluster gear assembly of FIGURE 1 and of the transmission reverse idler gear.

A reverse idler gear 72, having distinct gear portions 74 and 76, is slidably and rotatably mounted on an idler shaft 78 as illustrated in FIGURE 2. At certain times, as by a reverse shifter fork 80, reverse idler gear 72 is moved to the left along shaft 78 until gear portion 76 is in mesh with teeth 80 of cluster gear 38. At this time gear portion 74 engages teeth 82 of low or first forward speed gear 68.

Figure 3:
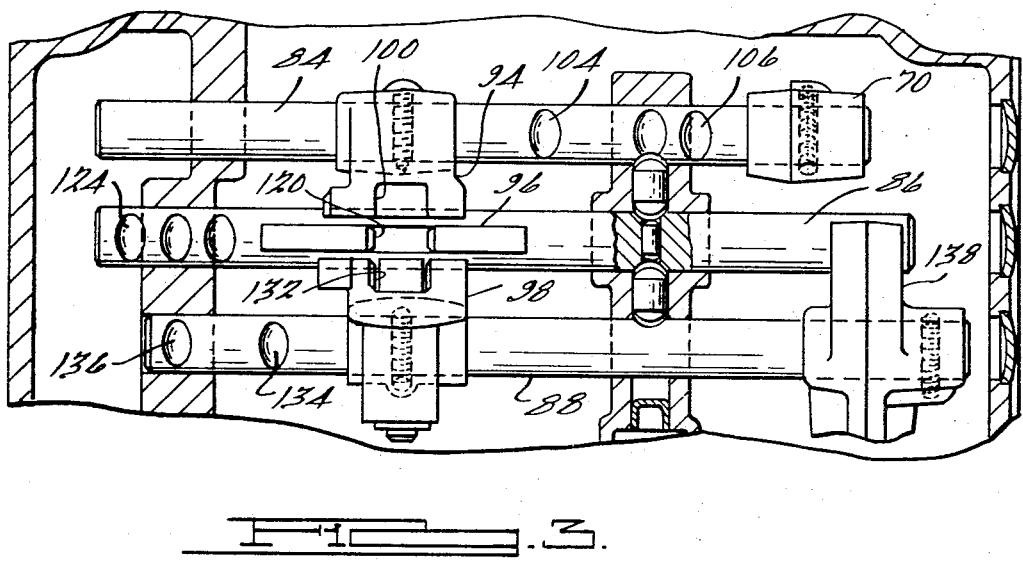
FIGURE 3 is a fragmentary view taken generally on the plane of line 3—3 of FIGURE 1 and looking in the direction of the arrows.

FIGURES 2 and 3 illustrate shift rails 84, 86 and 88 each of which carries at least one shifter fork. A manually actuated gear selector lever 90 is suitably pivotally supported in the case 12 and has its lower end 92 movable within confines defined by yoke-like members 94, 96 and 98 respectively secured to said shift rails.

When the shift rails 84, 86 and 88 are in their respective positions shown in FIGURE 3, the transmission is then in neutral. That is, no power is being transmitted from any of the gears of the cluster gear assembly to the main or output shaft 20. Each of the shift rails is, of course, axially movable in order to selectively move the proper gears axially on the main shaft 20 or the idler shaft so as to cause the desired power transmission from the input shaft 18 to the output shaft 20. For example, if the selector lever 90 is first pivoted to cause its end 92 to move into opening 100 of the yoke member 94 and then, with its end 92 remaining in said opening, pivoted so as to cause shift rail 84 to move axially to the right (with regard to FIGURE 3) until the spring-loaded detent 102 engages notch or recess 104, the shifter fork 70 will move low or first speed gear 68 along splines 64 of shaft 20 to a position wherein the teeth 82 of gear 68 are in meshed engagement with teeth 80 of cluster gear 38. At this time power will be transmitted from shaft 18, gear 58, cluster gear 32, cluster gear assembly 30, cluster gear 38, first speed gear 68 and its internal splines 66 and through splines 64 into the main or output shaft 20.

If the selector lever is now pivoted so as to move the shift rail 84 axially in the opposite direction to the left until the spring loaded detent 102 engages recess 106, shift fork 70 will move gear 68 to the left causing internally formed teeth 108 of gear 68 to be in engagement with externally formed teeth 110 of second speed gear 62. At this time power will be transmitted from the input shaft 18, through meshed gears 58 and 32, cluster gear assembly 30, meshed gears 36 and 62, teeth 110 of second speed gear 62 along with meshed teeth 108 of gear 68, gear 68 and through the splines 66 and 64 into the output shaft 20.

Gear 62 is provided with a modified pin-type synchronizer 112 comprised of a plurality of angularly spaced axially directed pins, such as at 113, retained within gear 62; pins 113, among other things, serve to support a conical member 114 adapted to at least at times frictionally engage a mating conical surface 116 formed in the body of gear 68. The synchronizer 112 per se and its operation is well known in the art. Accordingly, it will suffice to say that the sychronizer functions to synchronize the rotational speeds of gears 62 and 68 in order to effect a smooth engagement between teeth 108 and 110 of gears 68 and 62, respectively, thereby avoiding the occurrence of interference and clashing between such teeth during the time that teeth 108 and 110 are being brought into driving engagement with each other.

Once shift rail 84 is returned to the position shown in FIGURES 1 and 3, being retained thereby the detent 102 and recess 118, selector lever 90 may be pivoted so as to move end 92 out of opening 100 and into opening or slot 120 of yoke 96. Pivotal movement of the selector lever 90, while maintaining end 92 in slot 120, causes axial movement of the shift rail 86 to either the right or left of the position shown in FIGURE 3.

Assuming that the selector lever 90 is pivoted so as to cause shift rail 86 to move to the right until spring-loaded detent 122 engages recess 124, the shift fork 126 (fragmentarily illustrated in FIGURE 1) being operatively connected in any well known manner to the clutch sleeve 48, causes the sleeve 48 to also move to the right so as to result in the splines 50 engaging both the splines 52 of the hub 46 and teeth or splines 56 of gear 60.

As a consequence of the above movement of the shift rail 86, power is transmitted, in the same way as previously described, to the cluster gear assembly 30, through meshed cluster gear 34 and third speed gear 60, splines 56, clutch sleeve 48 and splines 50, through the external splines 52 of the hub 46 and the internal splines 47 thereof, and into the output shaft 20 by the splines 44 formed thereon. If the selector lever 90 is actuated as to move shift rail 86 in the opposite direction, wherein detent 122 engages recess 128, clutch sleeve 48 will be moved in a corresponding direction resulting in said sleeve 48 and its internally formed splines 47 completing a direct connection between teeth or splines 54 and splines 44 of the output shaft as by means of the hub 46.

A pin type synchronizer 130 is provided in conjunction with third and fourth speed gears, 60 and 58, and the clutch sleeve 48. This synchronizer, as well as that illustrated at 112, is well known in the art. Its function is, of course, to synchronize the rotational speeds of gears 58, 60 and sleeve 48 during periods of changing speeds.

If reverse drive operation is desired, shift rails 84 and 86 are positioned as shown in FIGURE 3 and the selector lever 90 is pivoted within casing 12 until the end 92 thereof is received within the opening 132 of shifter yoke 98. With end 92 remaining in opening 132, the selector lever is again pivoted causing the shift rail 88 to move to the left, as viewed in FIGURE 3, until recess 134 attains the position shown by recess 136. When the rail 88 is thusly moved the shifter fork 138, which is in engagement with reverse idler gear 72, has moved the gear 72 axially along the idler shaft 73 to a position wherein gear portion 76 is in meshed engagement with cluster gear 38 and gear portion 74 is in meshed engagement with teeth 82 of low or first speed gear 68. The effect of the above-described engagement of the reverse idler gear 72 is to reverse the direction of rotation of the low speed gear 68 and output shaft 20.

In view of the above it should be noted that during periods of either third or fourth speed gear operation, the low or first speed gear 68 is rotating freely on the splines 64 of output shaft 20 and not transmitting any power. Accordingly, during such periods, especially when the transmission is combined with an engine that is susceptible to the production of oscillatory frequencies, rattles may be produced by the free-running gear 68 and splined output shaft 20 as a consequence of induced vibratory or oscillatory frequencies.

Further, the sleeve 48, because of the manufacturing tolerances between the splines 50 and splines 52, also has a tendency toward the creation of oscillatory rattles during periods of first, second or reverse speed transmission operation. However, because the synchronizer 130 has a tendency to create a drag or resistance against sleeve 48, such tendencies toward oscillatory rattles by the sleeve 48 are damped.

It has been discovered that such oscillatory rattles can be eliminated by the introduction of simple resilient means situated so as to be in resilient abutting engagement as between one side of a spline formed on the shaft and one side of a cooperating spline formed internally of the gear carried by said shaft.

Figure 4:
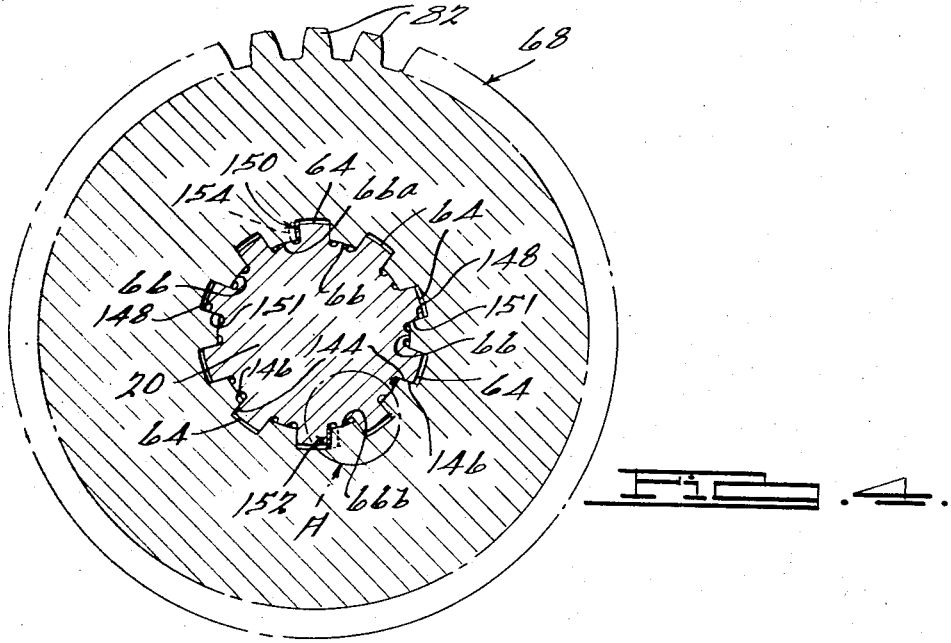
FIGURE 4 is a cross-sectional view taken substantially on the plane of line 4—4 of FIGURE 1 and looking in the direction of the arrows.

The preferred embodiment of the invention is illustrated in greater details in FIGURES 4 through 9. FIGURE 4, a transverse cross-sectional view taken substantially on the plane of line 4—4 of FIGURE 1, illustrates the low or first speed gear 68 in assembled relation with the main or output shaft 20. The shaft 20 is illustrated as having its longitudinally extending splines 64 (also illustrated in FIGURE 1) in engagement with splines 66 formed internally of gear 68.

Very often the various components comprising a power drive train have certain portions thereof referred to by functional description such as "drive side" and "coast side." The drive and coast sides are terms of reference, usually with regard to the vehicle being propelled in a forward direction, which relate to the particular side of either a gear tooth or a spline side which is either transmitting or absorbing the load or force therethrough at that particular time. As was previously stated, reasonable manufacturing tolerances are required in the machining of, for example, splines. Because of these tolerances there will always be some degree of relative motion that can be preceived as between the gear and its cooperating shaft resulting in a situation wherein both sides of each of the splines of the gear do not simultaneously contact both sides of each of the splines of the shaft.

Such drive and coast sides can be more clearly understood if reference is made to FIGURE 4 wherein the gear 68 during normal low speed operation, is assumed to be rotated in a counter-clockwise direction as viewed therein. Since gear 68 is at this time transmitting power to the, for example, ground engaging wheels (not shown) there will be some resistance offered to the rotation of shaft 20. Accordingly, it can be appreciated that during this forced rotation of gear 68 in a counter-clockwise direction, that side 144 of spline 66 will be in abutting engagement with side 146 of shaft spline 44. Accordingly, sides 144 and 146 can then be referred to as the drive sides of their respective splines. Again because of the manufacturing tolerances, even though these tolerances may be in the nature of not more than a few thousandths of an inch, some space will exist as between side 148 of spline 66 and side 151 of spline 64. Since there is no power being transmitted through those particular sides of each of the cooperating splines, such sides 148 and 151 can be referred to as the coast sides. In view of the above it should be apparent that each of the cooperating splines on both the shaft 20 and the gear 68 have a drive and a coast side.

Assuming now that power was being transmitted from the ground engaging wheels, to the prime mover through gear 68 and assuming further that the ground engaging wheels by virtue of the momentum of the vehicle were actually rotating shaft 20 at a speed greater than that called for by the prime mover, it can be seen that whatever perceptible space might have existed as between the respective coast sides will now exhibit itself as between the respective drive sides. That is, gear 68 is now attempting to retard rotation of shaft 20 and the power which is being transmitted from shaft 20 back through gear 68, is being transmitted through the abutting coast surfaces 148 and 150.

Heretofore many proposals have been made for providing means in combination with gears and shafts for eliminating the oscillatory rattles herein referred to. However, none of them have been completely accepted in that some are costly thereby preventing general use of such devices, while others have undesirable performance characteristics. Some of the anti-rattle devices for transmissions have provided means which have a tendency to force the particular gear in question to a position wherein, if allowed, its splines would be generally centralized between the cooperating splines of the shaft on which it is mounted. That is, if it is assumed that there was a total of six thousandths of an inch clearance between a spline on the shaft and the space between the cooperating splines in the gear, then the gear would be so rotated or positioned by the anti-rattle means so as to result in three thousandths of an inch space between the gear spline on each side of the splines on the shaft.

Such anti-rattle devices can never be totally satisfactory in that they become almost self defeating in that their primary function, which is of course, to prevent rattles, is only minimized by their causing a reduction in the maximum space existing between any two cooperating sides of respective splines. The gear is still highly susceptible to induced oscillatory rattling which usually exhibits itself because of the ability of the gear to have its splines strike against both sides of the splines of the cooperating shaft.

Other anti-rattle devices have also been proposed such as those which are carried by the gear and function as a dragging element between, for example, the splines of the shaft. In one such arrangement having an externally splined shaft and a gear with a splined aperture, an annular groove is formed in the midportion of the splined aperture. A deformable or resilient member is disposed within the groove at the base thereof throughout the entire circumference and an open ended circular ring is then inserted within the groove so as to be disposed generally radially inwardly of the said resilient member. The ring is provided with a relatively smooth outer periphery and has a plurality of spaced lugs on its inner periphery. The ring is of a size and configuration which enables it to be expanded radially outwardly when the gear is placed onto the splined shaft in order to allow the spaced lugs to grip opposite sides of sequential splines and thereby to reside generally within the space between such splines. As a result of the radial expansion of the ring, the smooth outer periphery simultaneously compresses deformable resilient means so as to attempt to dampen oscillation of the gear on the shaft. This type of anti-rattle device presents many problems among which is the problem of the gripping action achieved by the spaced lugs. Again because of manufacturing tolerances, there will be varying degrees of gripping action experienced by the shaft splines during such periods as when the gear is being axially moved along the shaft splines in order to effect the desired speed change. Further, the resilient or flexible means disposed at the base of the groove is usually vulnerable to attack by the various constituents in the lubricant used within the transmission. Corrosion of the flexible means might, of course, result in total loss of the intended function of the anti-rattle device. Further, because of the groove disposed in the midportion of the splined aperture, the gear splines have to be elongated in order to overcome the loss of required spline area for the transmission of power.

Accordingly, the invention as herein disclosed overcomes such drawbacks of the prior art by causing the gear to be continually urged in a direction with respect to shaft 20 which results in each of the drive sides of the respective cooperating splines to be in abutting engagement with each other. This is achieved by the use of simple and inexpensive spring means which may be roughly described as having, in its preferred embodiment, a form or configuration much like a clip with a bight portion thereof being slightly bowed.

Figure 5:
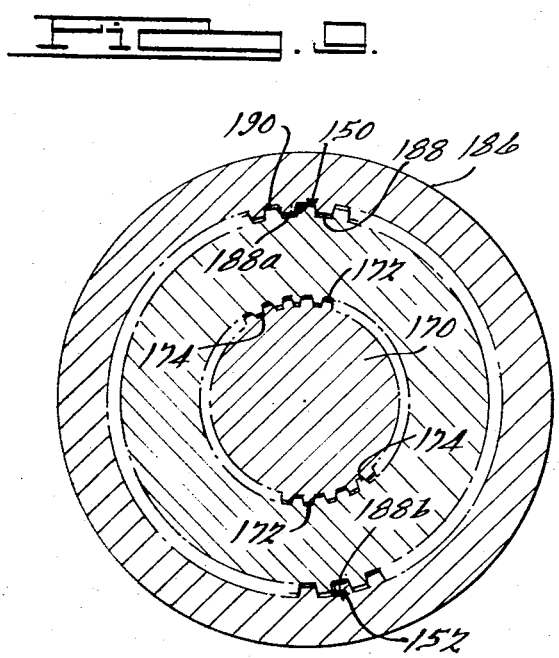
FIGURE 5 is a fragmentary perspective view, of the invention as generally shown by FIGURE 4, in exploded form.

For example, referring to FIGURES 4 and 5 (FIGURE 5 being a fragmentary exploded view of spline shaft 20 and gear 68) it can be seen that resilient or spring-like members 150 and 152 are spaced generally at 180 radial degrees with respect to each other about the centerline of gear 68. Each of the springs 150 and 152 are provided with end portions 154 which serve to grip the axial end surfaces of the designated splines formed within the gear 68.

Preferably two of the splines within gear 68, such as splines 66a and 66b, are formed in a manner to have a lesser thickness with such metal being removed from one side thereof as is necessary to subsequently accommodate the assembly thereto of the anti-rattle spring means 150 and 152, respectively. It should be noted that springs 150 and 152 are preferably placed onto such splines 66a and 66b so as to be on their respective coast sides.

Referring to FIGURE 6, which is an enlarged fragmentary portion of the area generally indicated by the circle A of FIGURE 4 (with the shaft 20 removed therefrom), it can be seen that prior to assembly of the gear 68 and anti-rattle spring 152 to the splined shaft 20, a distinct space indicated generally by X exists between the inner surface 156 of bight 158 and the modified side 160 of spline 66b.

Referring to FIGURE 7, which is a fragmentary cross-sectional view taken generally on the plane of line 7—7 of FIGURE 6, it can be seen in greater detail that the bight 156 is of a generally bowed configuration thereby permitting the easy introduction of the pre-assembled anti-rattle spring and gear onto the shaft 20. The relatively smooth and long outer surface 162 of the bight portion 156 presents a very low retarding force to any desired axial movement of the gear 68 along the spline shaft 20. Further, it should be obvious that because of the gradualness of the bow that any wear that might exhibit itself along the outer surface 162 is quickly compensated for by an ever increasing wear area being formed on the surface 162, which of course, has the effect of continuously decreasing any further tendency of wear on such anti-rattle spring.

Preferably, the modified splines 66a and 66b are of such a thickness in relation to the cross-sectional thickness of the bight portion 156 so that when the anti-rattle spring as 152 and gear 68 is assembled onto its cooperating splined shaft, that the bowed bight portion 156 will not be totally compressed against the modified side 160 of spline 66b. Some amount of resiliency, which would of course require the existence of some space even though smaller than that indicated by X, is desired so as not to result in a tendency to bind the gear and anti-rattle spring onto the spline shaft. Accordingly easy axial shifting of the gear is still maintained while all oscillatory rattles are eliminated without in any way sacrificing any loss of spline area contact on the drive side of the respective splines.

Even though the invention has been primarily disclosed with regard to a gear such as 68 which is mounted directly to the main or power output shaft 20, the invention can nevertheless be practiced in other arrangements where such cooperating splines exist and wherein manufacturing tolerances are required in order to permit relative sliding motion between such cooperating splines.

Figure 8:
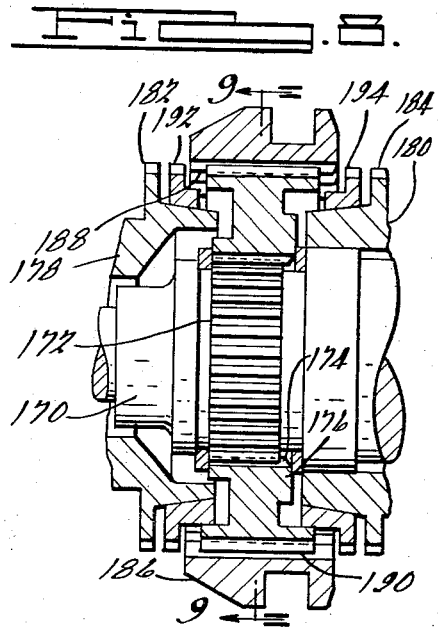
FIGURE 8 is a longitudinal cross-sectional view of another gear arrangement employing the invention.

For example, as previously stated with regard to clutch sleeve 48 wherein such cooperating splines are formed internally of the sleeve 48 and externally of the hub 46, the synchronizer 130 being of a pin type variety serves to damp any tendency of the clutch sleeve 48 towards oscillatory rattles. However, in many transmissions wherein clutch sleeves similar to that of 48 are employed, different forms of synchronizers are used and such synchronizers are not always of the type wherein a slight dragging or retarding action is continually transmitted to the clutch sleeve. FIGURE 8 is an example of such an arrangement.

Referring to FIGURE 8 in greater detail, an output shaft 170 is shown having formed thereon a splined portion 172 which engages an internally splined aperture 174 of a hub 176. The hub 176 is preferably in relatively tight engagement with splines 72 and is prevented from axially shifting along the shaft 170 as by suitable abutment means placed on either axial side thereof. A fourth speed or direct drive gear is fragmentarily illustrated as at 178 on one axial side of hub 176 while a third speed gear is illustrated fragmentarily at 180 at the other axial side of hub 176. Gears 178 and 180 have teeth 182 and 184, respectively, which are adapted to be selectively engaged by the sliding clutch sleeve 186, while the clutch sleeve has internally formed splines 188 which slidingly engage externally formed splines 190 and hub 176. Synchronizer rings 192 and 194 are respectively provided at opposite sides of the hub 176. The said synchronizer rings are of a type which are not always in continual frictional engagement during such periods of operation as when the clutch sleeve is in its neutral or free running position. Accordingly, there is not the same retarding force with respect to the sleeve 186 as is exhibited by the pin type synchronizer 130 with respect to its cooperating clutch sleeve 48.

During certain periods of operation in an arrangement as briefly described above, the possibility does exist, because of the mass of clutch sleeve 186 and because of the manufacturing tolerances required in making the splines 188 and 190 easily slidable with respect to each other, that oscillatory rattles would be created as between the clutch sleeve 186 and the hub 176. Accordingly, the invention as described with reference to the preceding figures can also be practiced with regard to the arrangement shown in FIGURES 8 and 9, wherein FIGURE 9 is a transverse cross-sectional view taken on the line 9—9 of FIGURE 8.

Again, as previously described with regard to, for example, FIGURE 4, the anti-rattle springs 150 and 152 would be preferably placed onto modified splines 188a and 188b in a manner as previously disclosed so as to urge the drive sides of the respective cooperating splines into engagement with each other.

The resilient spring means or anti-rattle springs 150 and 152 have been illustrated as being carried by the gear. It should, of course, be apparent that a reversal of parts is also contemplated by this invention. For example, certain of the externally formed splines on the shaft 20 or hub 176 could be selected to be suitably modified in order to carry the anti-rattle means in accordance with the teachings of this invention.

Although only one preferred embodiment of the invention has been disclosed and described, it is apparent that other embodiments and modifications of the invention may be made within the scope of the appended claims.

I claim:

1. A power transmission mechanism comprising a shaft, circumferentially spaced axially extending splines provided on said shaft, a gear splined for axial movement upon said shaft, the splines of said gear and said shaft being of such dimensions as to provide clearances therebetween, and resilient anti-rattle means situated between one side of at least one of said splines provided on said shaft and a coacting side of one of said gear splines for resiliently urging said gear and shaft to undergo relative rotation with respect to each other in order to take up clearances between coacting gear and shaft splines.

2. A power transmission mechanism comprising a shaft, circumferentially spaced axially extending splines provided on said shaft, a gear splined for axial movement upon said shaft, the splines of said gear and said shaft being of such dimensions as to provide clearances therebetween, and resilient anti-rattle means situated between one side of at least one of said splines provided on said shaft and a coacting side of one of said gear splines for resiliently urging said gear and shaft to undergo relative rotation with respect to each other in order to take up clearances between coacting gear and shaft splines, said anti-rattle means comprising a generally U-shaped spring member having opposite ends respectively engaging the opposed axial ends of one of the gear splines, said spring member also including a bight portion which resiliently abuts against said one side of said one shaft spline.

3. A power transmission mechanism comprising a shaft, circumferentially spaced aixally extending splines provided on said shaft, a gear splined for axial movement upon said shaft, the splines of said gear and said shaft being of such dimensions as to provide clearances therebetween, and resilient anti-rattle means carried by and secured to said gear so as to be between one side of at least one of said splines provided on said shaft and a coacting side of one of said gear splines for resiliently urging said gear and shaft to undergo relative rotation with respect to each other in order to take up clearances between coacting gear and shaft splines.

4. A power transmission mechanism comprising a shaft, a plurality of circumferentially spaced axially extending first splines provided on said shaft, a gear having a plurality of internally formed splines for axial movement along said shaft and said first splines, the first and second splines being of such dimensions as to provide clearances therebetween, and resilient anti-rattle means situated between selected first and second splines for resiliently urging said gear and shaft to undergo relative rotation with respect to each other in order to take up clearances between said first and second splines, said anti-rattle means comprising a first spring member carried by said gear so as to be movable therewith and a second spring member also carried by said gear, said first and second spring members being arranged with respect to each other so as to be in generally diametrically opposed relationship to each other about the centerline of said gear.

5. A power transmission mechanism comprising a shaft, a plurality of circumferentially spaced axially extending first splines provided on said shaft, each of said first splines having a drive side and a coast side, a gear having a plurality of internally formed second splines for axial movement along said shaft and first splines, each of said second splines also having a drive side and a coast side, said first and second splines being of such dimensions as to provide clearances therebetween, and resilient anti-rattle means situated between selected first splines and oppositely disposed coacting second splines for resiliently urging said gear to rotate relatively to said shaft in a direction which would result in the drive side of at least one of said first splines abuttably engaging the drive side of a coacting second splines, said anti-rattle means comprising a first spring member carried by said gear so as to be movable therewith and a second spring member also carried by said gear, said first and second spring members being arranged with respect to each other so as to be in generally diametrically opposed relationship to each other about the centerline of said gear.

6. A power transmission mechanism comprising a shaft, a plurality of circumferentially spaced axially extending first splines provided on said shaft, each of said first splines having a drive side and a coast side, a gear having a plurality of internally formed second splines for axial movement along said shaft and first splines, each of said second splines also having a drive side and a coast side, said first and second splines being of such dimensions as to provide clearances therebetween, and resilient anti-rattle means situated between one side of at least one of said first splines and an oppositely disposed coacting side of one of said second splines for resiliently urging said gear to rotate relatively to said shaft in a direction which would result in the drive side of at least one of said first splines abuttably engaging the drive side of a coacting second splines.

7. A power transmission mechanism comprising a shaft, a plurality of circumferentially spaced axially extending first splines provided on said shaft, each of said first splines having a drive side and a coast side, a gear having a plurality of internally formed second splines for axial movement along said shaft and first splines, each of said second splines also having a drive side and a coast side, said first and second splines being of such dimensions as to provide clearances therebetween, and resilient anti-rattle means situated between selected first and second splines for resiliently urging said gear to rotate relatively to said shaft in a direction which would result in the drive side of at least one of said first splines abuttably engaging the drive side of a coacting second spline, said anti-rattle means comprising a first spring member carried by said gear so as to be movable therewith and a second spring member also carried by said gear, said first and second spring members being arranged with respect to each other so as to be in generally diametrically opposed relationship to each other about the centerline of said gear, each of said springs being so contained by said selected first and second splines as to urge rotation of said gear in the same direction relative to said shaft.

8. A multiple speed power transmission mechanism comprising an input shaft, an output shaft, a plurality of circumferentially spaced longitudinally extending first splines provided on said output shaft, a cluster gear assembly including at least first and second gear portions, a first gear member freely rotatable about said output shaft in continual meshed engagement with said first gear portion, a second gear having an aperture with internally formed second splines therein adapted to coact with said first splines in order to prevent the free rotation of said second gear about said output shaft while permitting said second gear to be moved axially with respect thereto, said second gear having means associated therewith for axially moving said second gear to one extreme axial position in order to effect engagement between said first splines and said first gear, said second gear also being movable in the opposite direction to a second extreme axial position in order to be in meshed engagement with said second gear portion in order to provide driving power from said second gear portion to said first splines, said second gear also being capable of being positioned in a third axial position intermediate said extreme axial positions whereby said second gear is permitted to rotate freely with said second shaft without transmitting any power through either said first gear or said second gear portion, and resilient means provided between one side surface of at least one of said first splines and the confronting side surface of the adjacent second spline, and operative to continuously press the other side surface of each of said first splines against the other side surface of each of said second splines.

9. A multiple speed power transmission mechanism comprising an input shaft, an output shaft, a plurality of circumferentially spaced longitudinally extending first splines provided on said output shaft, a cluster gear assembly including at least first and second gear portions, a first gear member freely rotatable about said output shaft in continual meshed engagement with said first gear portion, a second gear having an aperture with internally formed second splines therein adapted to coact with said first splines in order to prevent the free rotation of said second gear about said output shaft while permitting said second gear to be moved axially with respect thereto, said second gear having means associated therewith for axially moving said second gear to one extreme axial position in order to effect engagement between said first splines and said first gear, said second gear also being movable in the opposite direction to a second extreme axial position in order to be in meshed engagement with said second gear portion in order to provide driving power from said second gear portion to said first splines, said second gear also being capable of being positioned in a third axial position intermediate said extreme axial positions whereby said second gear is permitted to rotate freely with said second shaft without transmitting any power through either said first gear or said second gear portion, and resilient means provided between opposed side surfaces of coacting first and second splines in order to rotate said second gear relative to said second shaft and first splines towards a condition of abutting engagement between said first splines and said second splines, said resilient means comprising a first spring member carried by said second gear so as to be movable therewith and a second spring member also carried by said gear, each of said spring members being of a configuration so as to simultaneously resiliently and abuttably engage a side surface of one of said first splines and a coacting opposed side surface of a cooperating second spline.

10. An anti-rattle arrangement for use in combination with a rotatable shaft having a gear axially slidable thereon and rotatable therewith wherein said shaft is provided with a plurality of externally formed circumferentially spaced axially extending first splines and said gear is provided with an aperture having a plurality of internally formed circumferentially spaced axially extending second splines, comprising at least one elongated resilient spring member secured to a selected one of said second splines, said selected spline having a transverse thickness substantially less than others of said second spline, the difference in thickness between said selected spline and others of said second splines being slightly greater than the thickness of said spring member in order to enable the insertion of said selected spline and said resilient spring member secured thereto between sequentially spaced cooperating first splines in order to complete assembly of said gear to said shaft, said spring functioning to resiliently frictionally engage said selected spline and one of said cooperating splines in order to resiliently bias said gear in a direction resulting in abuttable engagement between said first and second splines whenever said gear is permitted to rotate freely with said shaft.

11. An anti-rattle arrangement for use in combination with a rotatable shaft having a gear axially slidable thereon and rotatable therewith wherein said shaft is provided with a plurality of externally formed circumferentially spaced axially extending first splines and said gear is provided with an aperture having a plurality of internally formed circumferentially spaced axially extending second splines, comprising at least one elongated resilient spring member secured to a selected one of said second splines, said selected spline having a transverse thickness substantially less than others of said second splines, the the difference in thickness between said selected spline and others of said second splines being slightly greater than the thickness of said spring member in order to enable the insertion of said selected spline and said resilient spring member secured thereto between sequentially spaced cooperating first splines in order to complete assembly of said gear to said shaft, said difference in thickness being totally attributable to a reduction in material on one side of said selected spline, and said spring functioning to resiliently frictionally engage said selected spline and one of said cooperating splines in order to resiliently bias said gear in a direction resulting in abuttable engagement between said first and second splines whenever said gear is permitted to rotate freely with said shaft.

12. An anti-rattle arrangement for use in combination with a rotatable shaft having a gear axially slidable thereon and rotatable therewith wherein said shaft is provided with a plurality of externally formed circumferentially spaced axially extending first splines and said gear is provided with an aperture having a plurality of internally formed circumferentially spaced axially extending second splines with each of said splines having a drive side and a coast side, comprising at least one elongated resilient spring member secured to a selected one of said second splines, said selected spline having a transverse thickness substantially less than others of said second splines, the difference in thickness between said selected spline and others of said second syplines being slightly greater than the thickness of said spring member in order to enable the insertion of said selected spline and said resilient spring member secured thereto between sequentially spaced cooperating first splines in order to complete assembly of said gear to said shaft, said difference in thickness being totally attributable to a reduction in material forming said selected spline from only the coast side of said selected spline, and said spring functioning to resiliently frictionally engage said selected spline and one of said cooperating splines in order to resiliently bias said gear in a direction resulting in abuttable engagement between said first and second splines whenever said gear is permitted to rotate freely with said shaft.

References Cited

UNITED STATES PATENTS

| | | | |
|---|---|---|---|
| 1,467,732 | 9/1911 | Litle | 192—69 |
| 2,696,124 | 12/1954 | Flowers et al. | 74—325 |
| 2,800,800 | 7/1957 | Dunn | 74—325 |
| 2,899,038 | 8/1959 | Wellauer | 192—55 |
| 3,081,854 | 3/1963 | Snyder | 192—69 |
| 3,093,007 | 6/1963 | Aebersold | 74—409 |
| 3,109,317 | 11/1963 | Cousino et al. | 74—411 |
| 3,191,735 | 6/1965 | Wavak | 74—409 |

MARTIN P. SCHWADRON, *Primary Examiner.*

DAVID J. WILLIAMOWSKY, *Examiner.*

C. J. HUSAR, *Assistant Examiner.*